United States Patent
Lecoffre et al.

(10) Patent No.: US 7,967,991 B2
(45) Date of Patent: Jun. 28, 2011

(54) CYCLONIC FLOW SEPARATOR

(75) Inventors: Yves Lecoffre, Grenoble (FR); Vincent Peyrony, Idron (FR)

(73) Assignees: Total SA, Courbevoie (FR); Schlumberger Technology Corporation, Sugar Land, TX (US)

( * ) Notice: Subject to any disclaimer, the term of this patent is extended or adjusted under 35 U.S.C. 154(b) by 516 days.

(21) Appl. No.: 12/178,925

(22) Filed: Jul. 24, 2008

(65) Prior Publication Data

US 2009/0026151 A1    Jan. 29, 2009

(30) Foreign Application Priority Data

Jul. 27, 2007 (FR) ...................... 07 05531

(51) Int. Cl.
- B01D 17/038 (2006.01)
- C02F 1/38 (2006.01)
- E21B 43/38 (2006.01)

(52) U.S. Cl. ............. 210/787; 210/512.3; 209/713; 209/715; 209/725; 55/447

(58) Field of Classification Search ........... 210/787, 210/512.3; 209/713, 715, 725; 55/447
See application file for complete search history.

(56) References Cited

U.S. PATENT DOCUMENTS

| | | | |
|---|---|---|---|
| 3,415,383 A | 12/1968 | Earle, Jr. et al. | |
| 3,887,342 A | 6/1975 | Bunnelle | |
| 4,702,837 A | 10/1987 | Lecoffree et al. | |
| 6,426,010 B1 | 7/2002 | Lecoffree et al. | |

FOREIGN PATENT DOCUMENTS

| | | |
|---|---|---|
| FR | 2592324 A | 7/1987 |
| FR | 2617741 A | 1/1989 |
| FR | 2771029 A1 | 5/1999 |
| WO | 2006085759 A1 | 8/2006 |

OTHER PUBLICATIONS

INPI, French Preliminary Search Report and Opinion, FR0705531, dated Mar. 3, 2008.

Frans T.M. Nieuwstadt and Maarten Dirkzwager, A Fluid Mechanics Model for an Axial Cyclone Separator, Ind. Eng. Chem. Res. 1995, vol. 34, No. 10, pp. 3399-3404.

*Primary Examiner* — David A Reifsnyder
(74) *Attorney, Agent, or Firm* — Patzik, Frank & Samotny Ltd.

(57) ABSTRACT

The separator has a cylindrical separator chamber and an impeller on the same axis and driven in rotation. The impeller has a core, an inlet for receiving an axial flow of fluid, an outlet for injecting the fluid into the separator chamber, and guide channels formed between the inlet and the outlet of the impeller at the periphery of the core. The core has a portion of diameter equal to or greater than the inner diameter of the separator chamber. In this portion, the guide channels extend longitudinally, and they then continue as far as the outlet from the impeller, which outlet is cylindrical in shape and of diameter equal to the inner diameter of the separator chamber.

12 Claims, 2 Drawing Sheets

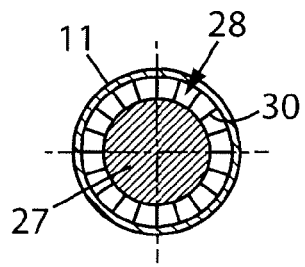
FIG. 4
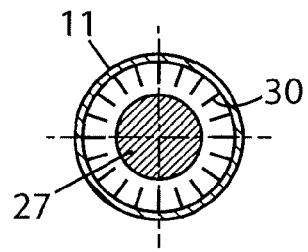
FIG. 5
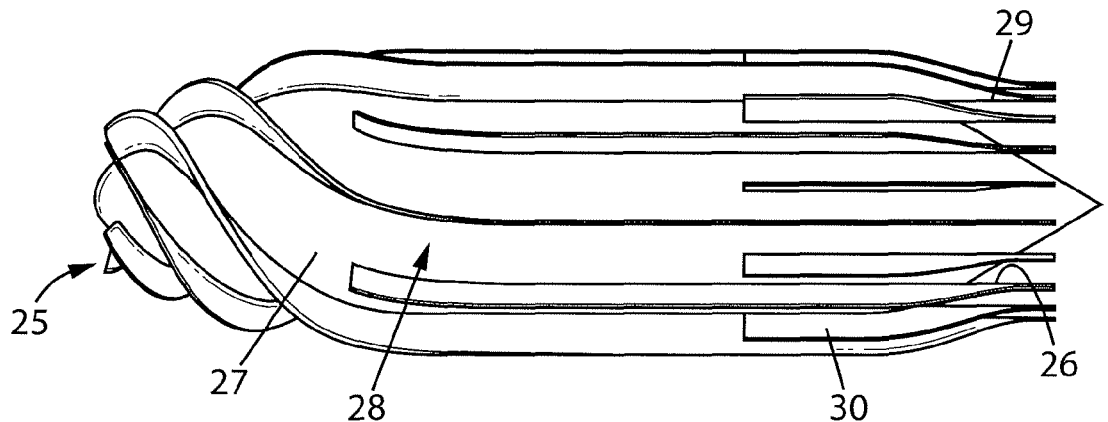
FIG. 6
FIG. 7
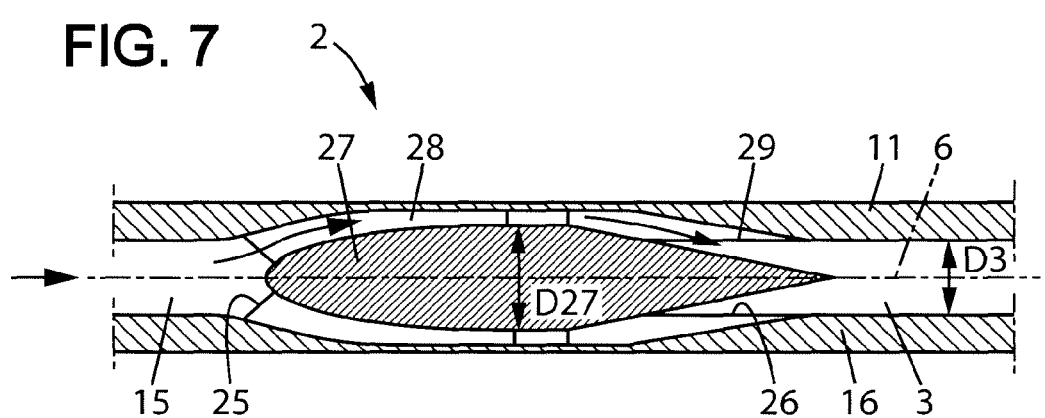

CYCLONIC FLOW SEPARATOR

FIELD OF THE INVENTION

The invention relates in general to a cyclonic flow separator for separating immiscible components of different densities forming a fluid medium.

BACKGROUND OF THE INVENTION

A non-exclusive application of such a separator lies in producing petroleum. In this application, of particular interest to the inventors, and without this being considered as limiting, the separator is placed for example in an oil well. It receives a fluid comprising water and oil coming from a producing reservoir, and it extracts therefrom oil having a reduced water content. The water separated from the extracted oil is reinjected into a level of the reservoir, possibly a level different from that of the producing reservoir, without any need for it to be separated or processed in a surface installation. A variant is to separate the fluids in the well and to raise both of them to the surface.

A separator of the invention can be used in a variety of other known applications for apparatuses of this kind, for example to de-dust gas.

Cyclonic flow conditions in a chamber for separating the components of a fluid are particularly effective for separating the components by weight. At the outlet from the cyclonic flow separator chamber, the heavier components are recovered from a radial position that is further from the center than the lighter components. In an ideal cyclonic flow, the tangential speed of the particles in the fluid medium increases in application of a hyperbolic relationship ongoing from the periphery of the chamber to a radius where it reaches a maximum value, and then decreases between said radius and the center of the chamber in application of a linear relationship. In particular, it is zero at the center of the separator chamber. In the hyperbolic zone, this subjects the particles of the fluid medium to radial accelerations that are inversely proportional to the cube of the radius.

Document FR-A-2 592 324 describes a separator for heterogeneous liquids, the separator having a cylindrical separator chamber and an axial impeller that rotate together about their common axis. The impeller has a core about which guide channels bring a fluid medium into the chamber in order to generate a cyclonic flow therein. Compared with static separators, such rotating separators have the advantage of reducing friction due to the differences in speed between the walls of the chamber and the injected medium, which friction can disturb the cyclonic conditions.

In practice, cyclonic flow conditions are difficult to achieve over the length of the chamber.

OBJECT AND SUMMARY OF THE INVENTION

An object of the present invention is to improve rotary type cyclonic flow separators. It is desired in particular to improve the separation power by obtaining good control over cyclonic conditions.

A cyclonic flow separator in an embodiment comprises a cylindrical separator chamber rotatably mounted about an axis; and an impeller coaxially mounted with the cylindrical separator chamber, the impeller and cylindrical chamber being driven in rotation about said axis. The impeller comprises a core having a portion of diameter substantially equal to or greater than an inner diameter of the separator chamber, an inlet for receiving a substantially axial flow of fluid, an outlet for injecting the fluid into the separator chamber, said outlet having a substantially cylindrical shape and a diameter substantially equal to the inner diameter of the separator chamber; and a plurality of guide channels formed between the inlet and the outlet of the impeller at a periphery of the core. In this portion, the guide channels are substantially rectilinear and parallel to the axis of the separator chamber, and then they extend in substantially rectilinear manner as far as the outlet from the impeller.

These dispositions come close to ideal conditions in which the distribution of tangential speeds in the fluid within the device matches the theoretical hyperbolic relationship as a function of radial position. The flow in the separator chamber is then under genuine cyclonic conditions or very close thereto. Thus, the performance of the separator is improved.

In embodiments of the separator, recourse may optionally also be had to one or more of the following dispositions:
  the guide channels are substantially helical in shape beside the inlet of the impeller, to bring the fluid progressively into rotation with the separator chamber and the impeller;
  said portion of the core has a diameter substantially equal to the inner diameter of the separator chamber;
  the guide channels are subdivided from said portion of the core towards that outlet of the impeller; and
  the guide channels are greater than ten in number, and typically not less than twenty, at the outlet from the impeller.

Another aspect of the invention relates to a method of producing petroleum, the method comprising:
  placing at least one component separator in an oil installation, wherein the separator comprises:
    a cylindrical separator chamber rotatably mounted about an axis; and
    an impeller coaxially mounted with the cylindrical separator chamber,
  wherein the impeller comprises:
    a core having a portion of diameter substantially equal to or greater than an inner diameter of the separator chamber;
    an inlet opposite from said separator chamber;
    an outlet directed towards the separator chamber and having a substantially cylindrical shape and a diameter substantially equal to the inner diameter of the separator chamber; and
    a plurality of guide channels formed between the inlet and the outlet of the impeller at a periphery of the core, the guide channels being at least in said portion of the core, substantially rectilinear and parallel to the axis of the separator chamber, wherein the substantially rectilinear guide channels extend from said portion to the outlet of the impeller,
  wherein the separator chamber has at least first and second concentric outlets at an end opposite from the impeller, the second outlet being closer to said axis of the separator chamber than the first outlet;
  driving the separator chamber and the impeller to rotate about said axis;
  delivering a substantially axial flow of a fluid including oil and water to said inlet of the impeller;
  collecting water from said first outlet of the separator chamber; and
  extracting petroleum with a reduced residual water content from said second outlet of the separator chamber.

BRIEF DESCRIPTION OF THE DRAWINGS

FIG. 4 is a cross-section view on reference line IV-IV of FIG. 3;

FIG. 5 is a cross-section on reference line V-V of FIG. 3;

FIG. 6 is a side view of the impeller of the separator, without showing any other elements of the FIG. 1 separator; and FIG. 7 is a view on a larger scale of another embodiment of the impeller of the separator of the invention.

MORE DETAILED DESCRIPTION

Figure 1:
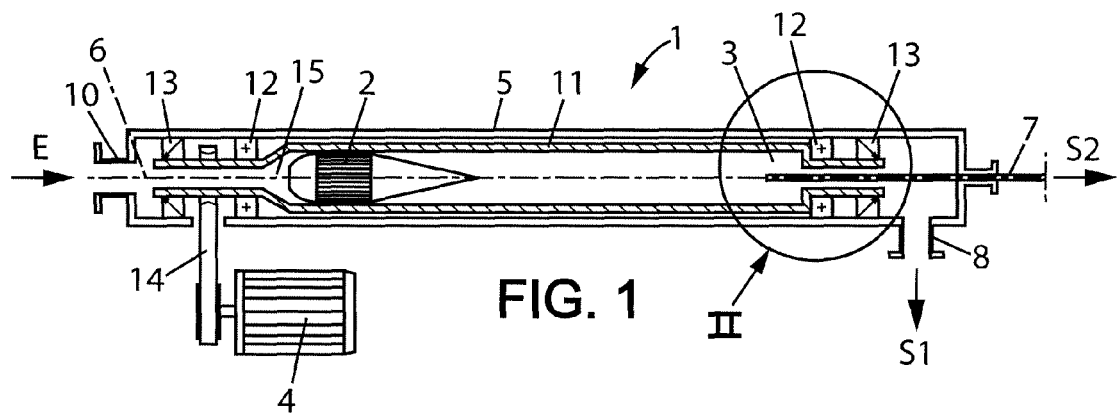
FIG. 1 is a theoretical diagram in longitudinal section showing a separator for separating components of a fluid medium.

FIG. 1 is a general view in axial section of an embodiment of a cyclonic flow separator. This example of a separator 1 comprises a stationary outer envelope 5 of generally cylindrical shape about an axis 6, having an inlet E for a fluid medium to be separated, a first fluid outlet S1 and a second fluid outlet S2. Inside the envelope 5, a cylindrical separator chamber 3 and a coaxial impeller 2 are mounted coaxially inside the envelope 5 and pivotally about the axis 6.

The chamber 3 and the impeller 2 belong to an assembly 11 that is pivotally mounted inside the outer envelope 5 on bearings 12. The number and position of the bearings may differ from that shown in FIG. 1. Dynamic seals 13 provide sealing between the moving assembly 11 and the stationary outer envelope 5. In the embodiment of FIG. 1, the moving assembly 11 is rotated by a belt 14 itself driven by a motor 4.

The inlet E at an upstream end of the separator 1 is fed via an axial coupling 10 with a flow under pressure of a fluid medium to be separated, such as a water-oil emulsion.

The first outlet S1 is implemented in this embodiment by a lateral coupling 8 on the outer envelope 5 of the separator 1. This first outlet S1 serves to deliver a first component of the fluid that is of relatively high density, being picked up at the outlet of the separator chamber 3, i.e. at its end remote from the impeller 2, at a distance from the axis 6. The second outlet S2 in this embodiment is implemented by a tube 7 centered on the axis 6 and communicating with the inside of the separator chamber 3. This second outlet S2 enables a second fluid component to be delivered that is of density lower than that of the first component.

In the application to producing petroleum, the first fluid component is water (having a residual oil content that is much lower than the oil content of the emulsion inserted via the inlet E), and the second fluid component is oil (having a residual water content that is much lower than the water content of the emulsion inserted at the inlet E).

After the inlet E, the fluid medium (water-oil) penetrates into the upstream end of the moving assembly 11, moves into an upstream chamber 15, passes through the impeller 2 which transforms the movement in translation of the fluid into movement in rotation about the axis 6 with a speed of rotation identical to that of the assembly 11, and is injected into the periphery of the separator chamber 3 with a tangential speed substantially equal to that of the wall of the chamber 3.

With this type of inlet into the separator chamber 3, the tangential speed of the fluid in the chamber 3 varies in a manner that is substantially inversely proportional to the radius, increasing very strongly on approaching the center, i.e. the axis 6. This leads to accelerations that are favorable to separating the fluid, and in particular to concentrating the second fluid component of smaller density than the first fluid component towards the center of the separator chamber 3 as the flow continues.

The relatively dense first fluid component (water) is then discharged from the separator chamber 3 via the annular first outlet 31 at the downstream end of the chamber 3 that is in communication with the outlet S1 of the separator via an annular channel 9. These elements can be seen more easily in FIG. 2 which is a view on a larger scale of the right-hand portion of FIG. 1. In the application to petroleum production, the water as evacuated in this way, with a residual oil content that can be very low, is reinjected into the reservoir at a level that may be different from the level from which the emulsion mixture is taken for delivery to the inlet E of the separator.

Figure 2:
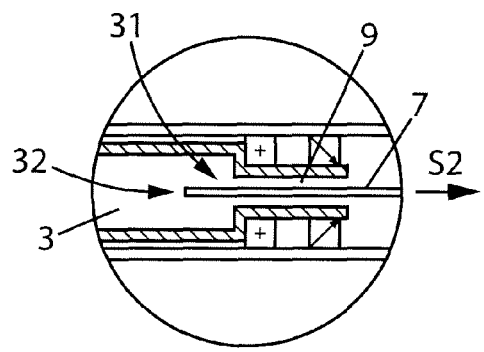
FIG. 2 is a view on a larger scale showing the downstream portion of the separator chamber of the FIG. 1 separator.

The second fluid component of relatively smaller density (oil) is extracted via a second outlet of the separator chamber 3 that is constituted in this embodiment by an inlet orifice 32 to the central tube 7. This tube 7 in the embodiment of FIGS. 1 and 2 is secured to the outer envelope 5 of the separator, and does not rotate with the separator chamber 3, thereby simplifying construction of the apparatus.

In a variant arrangement for the outlets from the separator chamber 3, they can both be annular in shape and concentric about the axis of the chamber, e.g. in the manner described in FR-A-2 771 029. Various arrangements are possible at the outlet from the cyclonic flow separator chamber 3. In general, the outlets are concentric with the denser component (water) being evacuated through the outlet that is further from the axis, while the lighter component (oil) is extracted through the outlet closer to the axis. Under certain circumstances, a gas outlet (least dense phase located most centrally) may be provided in addition to the outlets for oil and water.

Figure 3:
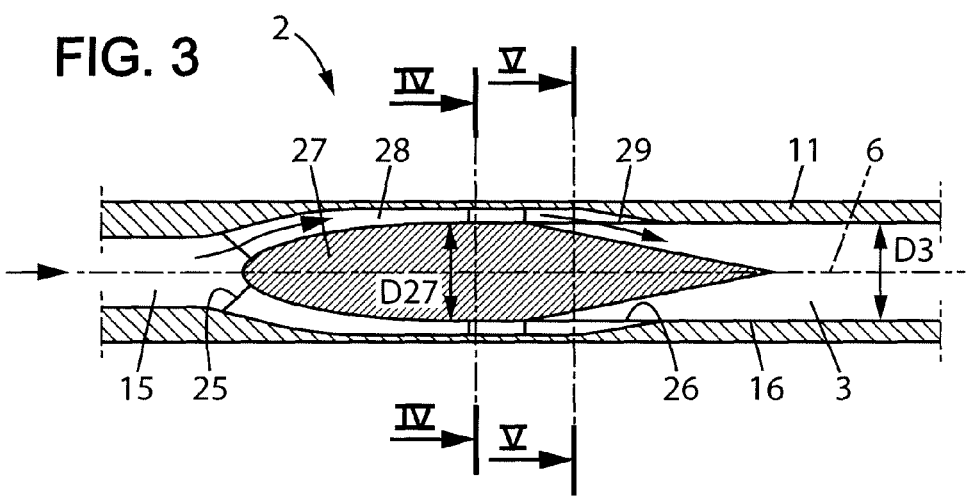
FIG. 3 is a view on a larger scale of the impeller of a separator of the type of the invention.

FIG. 3 is an enlarged view in longitudinal section similar to that of FIG. 1, showing an impeller 2 in an embodiment of a separator of the invention. The impeller 2 is situated between the upstream chamber 15 and the separator chamber 3. It has an inlet 25 in communication with the upstream chamber 15, channels 28 for guiding the fluid medium, an outlet 26 leading to the separator chamber 3, and a core 27 that is substantially coaxial about the axis 6 of the separator. The core 27 is in the form of an asymmetrical bullet, for example pointing towards the inlet of the impeller 2 so as to bring the fluid progressively towards the periphery of the impeller 2, while being conically shaped towards the separator chamber 3.

FIG. 4 is a cross-section view on reference line IV-IV of FIG. 3. It can be seen that the guide channels 28 are defined by blades 30, e.g. radial blades, extending from the core 27 to the wall of the assembly 11, thus forming cavities that are closed in the plane of FIG. 4.

FIG. 5 is a cross-section view on reference line V-V of FIG. 3, i.e. in the region of the outlet 26. In this region, the blades 30 defining the guide channels 28 separate from the core 27, remaining connected to the wall of the assembly 11, thus forming cavities that are open towards the inside of the separator chamber 3, facing the conical portion of the core 27.

In the outlet region 26, the inner ends of the radial blades 30 extend along longitudinal edges 29 that are substantially rectilinear and parallel to the axis 6 of the separator. As shown in FIG. 3, these edges 29 lie on a cylindrical surface extending the inner face 16 of the separator chamber 3, which face has an inner diameter D3. It is this cylindrical surface that defines the outlet 26 from the impeller 2 and the inlet to the separator chamber 3.

The outlet 26 from the impeller 2 is thus substantially cylindrical in shape and of diameter equal to the inner diameter D3 of the separator chamber 3. It is defined by the openings of the guide channels 28 between the edges 29.

Between the inlet 25 and the outlet 26 of the impeller, the core 27 has a portion of diameter D27 that is greater than or equal to the inner diameter D3 of the separator chamber 3.

The diameters D3 and D27 are shown as being equal in FIG. 3. On entering into the separator chamber 3, i.e. at the outlet 26 from the impeller, the flow of the fluid essentially has a tangential speed component. Its centripetal speed component may be very small if the transition between the outside diameter of the guide channels 28 and the inner diameter D3 of the separator chamber is progressive, as shown. By means of the way the outlet 26 of the impeller 2 is arranged, the tangential speed of the fluid injected into the chamber 3 is practically the same as the speed of the wall of said chamber, such that the fluid enters into the separator chamber 3 without forming undesirable friction or turbulence.

FIG. 6 is a side view of the impeller 2 shown on its own, showing the shapes of the core 27 and of the radial blades 30 defining the guide channels 28.

The impeller 2 shown in FIG. 6 has guide channels 28 close to the inlet 25, said guide channels being substantially helical in shape so as to bring the fluid progressively into rotation at the same speed as the rotation of the assembly 11. Thereafter, the guide channels 28 are rectilinear in shape being substantially parallel to the axis 6 as far as the outlet 26 from the impeller 2.

As shown in FIG. 6, in the portion of diameter D27 where the guide channels 28 become rectilinear and longitudinal, said channels are subdivided into a number that is greater than the number of channels close to the inlet 25.

The guide channels 28 may also be subdivided into a greater number prior to the outlet 26, to further improve the rotary drive applied to the fluid before it enters into the separator chamber 3.

In the embodiment of the impeller shown in FIG. 6, there are five guide channels 28 at the inlet to the impeller, ten guide channels 28 in an intermediate segment, and twenty guide channels downstream from said segment as far as the outlet 26 from the impeller.

It is advantageous to have a relatively large number of guide channels 28 at the outlet 26 from the impeller 2 in order to encourage relatively undisturbed penetration of the fluid into the separator chamber 3. A number of guide channels 28 greater than ten is consequently advantageous. This number is preferably equal to or greater than twenty.

FIG. 7 is a figure similar to FIG. 3 showing a variant of the impeller 2 in which the diameter D27 of the intermediate portion of the core 27 is greater than the diameter D3 of the separator chamber.

The above-described cyclonic flow separator is suitable for separating any fluid medium having immiscible components of different densities, and not only for separating a water and oil emulsion.

In the above description, the fluid medium is presented as having only two fluid components. Naturally, the medium could have more than two components of different densities. The separator chamber could then have more than two outlets enabling the various fluid components to be extracted. The components to be separated in the fluid medium are not restricted to liquids such as oil and water; they could also include gases and/or solid particles in suspension in the fluid medium.

In the application to producing petroleum, the water-oil emulsion (possibly also containing gas dissolved in the oil or injected from the surface) comes from a petroleum reservoir, and is delivered to the inlet E of the separator 1. The moving assembly 11 comprising the impeller 2 and the separator chamber 3 is set into rotation, for example, by the shaft of a downhole pump or by a motor located close to the separator. If the separator is placed in a well, the oil extracted via the outlet S2 is raised to the surface installation at the well head, while the water evacuated via the outlet S1 can be reinjected into a level of the reservoir that may be different from the level of the reservoir that is producing.

Alternatively, it is possible to separate the fluid components at the bottom of the well and to bring the separated components to the surface. Another alternative embodiment includes bringing the emulsion to the surface and performing separation at the surface, e.g. on an offshore platform. In yet another alternative embodiment, the fluid mixture is transferred to a submarine well head and to perform fluid separation at the sea bottom.

The invention claimed is:

1. A separator for separating the components of a fluid medium, the separator comprising:
   a cylindrical separator chamber rotatably mounted about an axis; and
   an impeller coaxially mounted with the cylindrical separator chamber, the impeller and cylindrical chamber being driven in rotation about said axis,
   wherein the impeller comprises:
   a core having a portion of diameter substantially equal to or greater than an inner diameter of the separator chamber;
   an inlet for receiving a substantially axial flow of fluid;
   an outlet for injecting the fluid into the separator chamber, said outlet having a substantially cylindrical shape and a diameter substantially equal to the inner diameter of the separator chamber; and
   a plurality of guide channels formed between the inlet and the outlet of the impeller at a periphery of the core, the guide channels being at least in said portion of the core, substantially rectilinear and parallel to the axis of the separator chamber, wherein the substantially rectilinear guide channels extend from said portion to the outlet of the impeller.

2. The separator of claim 1, wherein the guide channels are substantially helical in shape beside the inlet of the impeller, to bring the fluid progressively into rotation with the separator chamber and the impeller.

3. The separator of claim 1, wherein said portion of the core has a diameter substantially equal to the inner diameter of the separator chamber.

4. The separator of claim 1, wherein the guide channels are subdivided from said portion of the core towards said outlet of the impeller.

5. The separator of claim 1, wherein the guide channels are greater than ten in number at the outlet of the impeller.

6. The separator of claim 5, wherein the guide channels are not less than twenty in number at the outlet of the impeller.

7. A method of producing petroleum, comprising:
   placing at least one component separator in an oil installation, wherein the separator comprises:
   a cylindrical separator chamber rotatably mounted about an axis; and
   an impeller coaxially mounted with the cylindrical separator chamber,
   wherein the impeller comprises:
   a core having a portion of diameter substantially equal to or greater than an inner diameter of the separator chamber;
   an inlet opposite from said separator chamber;
   an outlet directed towards the separator chamber and having a substantially cylindrical shape and a diameter substantially equal to the inner diameter of the separator chamber; and
   a plurality of guide channels formed between the inlet and the outlet of the impeller at a periphery of the core, the guide channels being at least in said portion of the core, substantially rectilinear and parallel to the axis of the separator chamber, wherein the substantially rectilinear guide channels extend from said portion to the outlet of the impeller, wherein the separator chamber has at least first and second concentric outlets at an end opposite from the impeller, the second outlet being closer to said axis of the separator chamber than the first outlet;

driving the separator chamber and the impeller to rotate about said axis;

delivering a substantially axial flow of a fluid including oil and water to said inlet of the impeller;

collecting water from said first outlet of the separator chamber; and extracting petroleum with a reduced residual water content from said second outlet of the separator chamber.

8. The method of claim 7, wherein the guide channels are substantially helical in shape beside the inlet of the impeller, so as to bring the fluid progressively into rotation with the separator chamber and the impeller.

9. The method of claim 7, wherein said portion of the core has a diameter substantially equal to the inner diameter of the separator chamber.

10. The method of claim 7, wherein the guide channels are subdivided from said portion of the core and towards the outlet of the impeller.

11. The method of claim 7, wherein said guide channels are greater than ten in number at the outlet of the impeller.

12. The method of claim 11, wherein said guide channels are not less than twenty in number at the outlet of the impeller.

* * * * *